Dec. 13, 1927.
W. S. CALCOTT ET AL
1,652,812
PROCESS OF MANUFACTURING TETRA-ETHYL LEAD
Filed Nov. 4, 1925
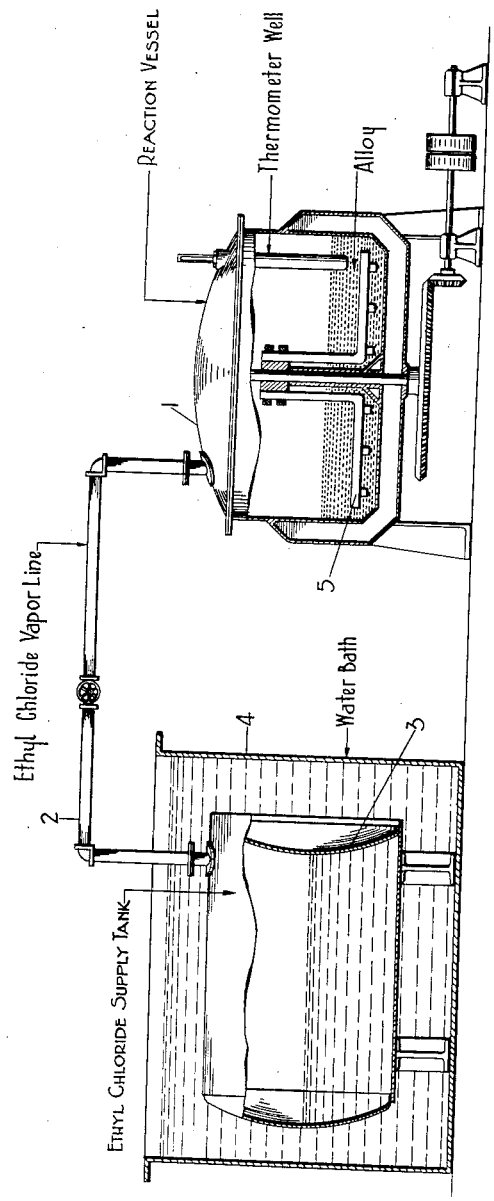
Inventors William S Calcott
Frederick L English
By their Attorney Patented Dec. 13, 1927.

1,652,812

UNITED STATES PATENT OFFICE.

WILLIAM S. CALCOTT, OF PENNS GROVE, AND FREDRICK L. ENGLISH, OF CARNEYS POINT, NEW JERSEY, ASSIGNORS TO E. I. DU PONT DE NEMOURS & COMPANY, OF WILMINGTON, DELAWARE, A CORPORATION OF DELAWARE.

PROCESS OF MANUFACTURING TETRA-ETHYL LEAD.

Application filed November 4, 1925. Serial No. 66,775.

This invention relates to the manufacture of tetra ethyl lead from ethyl chloride and a lead sodium alloy at low pressures. More particularly it is concerned with a process for treating the lead sodium alloy with ethyl chloride under a pressure less than the vapor pressure of ethyl chloride at the prevailing temperature in the reaction vessel.

One process at present in use for the preparation of tetra ethyl lead from ethyl chloride consists in treating lead sodium alloy with liquid ethyl chloride in an autoclave at 40–50° C., the pressure developed being from about 50 to 100 lbs. per square inch. This process is, however, attended by several disadvantages, chief among which are the difficulties encountered in controlling the reaction and the expense of the special autoclaves required.

We have developed a new method adapted for ready control and which may be operated at any desired combination of temperature and pressure, provided the pressure used is less than the vapor pressure of ethyl chloride at the temperature of the reaction vessel. By this new process the disadvantages attending the use of high pressure are avoided.

Briefly, in carrying our process into effect, a charge of lead sodium alloy is placed in a vessel that can be closed gastight and which communicates with the upper part of another vessel, provided with means for controlling the temperature therein in order to maintain in the system the pressure desired. This vessel will preferably contain liquid ethyl chloride, and will be connected in such manner that ethyl chloride vapor may flow therefrom to the reaction vessel, or vice versa.

The reaction vessel is then swept with ethyl chloride vapor to displace the air, and then the system is closed to the atmosphere. The reaction is now allowed to proceed until the vapor is no longer absorbed. Agitation of the alloy increases the rate of absorption. The reaction vessel may be maintained at any desired temperature, above that of the ethyl chloride storage chamber, without affecting the pressure in the system, since any condensation will take place in the cooler storage chamber. Upon completion of the reaction, the tetra ethyl lead is recovered from the reaction mass by steam distillation.

Yields of 70% and higher (based upon the sodium content of the alloy) can be obtained by this process. An important advantage of the new process over former processes is that it permits of the use of ethyl chloride at very low pressure in the synthesis of tetra ethyl lead. As already suggested, the pressure is automatically self-regulating since fall of pressure in the system is followed by increased evaporation in the storage chamber while a rise in temperature in the reaction vessel merely forces vapor back into the storage vessel where it is condensed. For the purpose of explaining my process more clearly, one arrangement of apparatus which may be employed in carrying out the process is shown in the annexed drawing. The showing is diagrammatic and partly in section.

A jacketed vessel 1 is provided with a stirrer or agitator 5. The upper part of said vessel connects by means of a pipe or conduit 2 with the upper part of a supply tank 3, which supply tank is immersed in a water bath 4. In operation the alloy is placed in the reaction vessel and the ethyl chloride preferably in the storage chamber. As the ethyl chloride vaporizes it passes into the reaction vessel where, upon contact with the alloy, it is absorbed. The higher the temperature of the reaction vessel the faster the absorption. Obviously, however, the rise in temperature in the reaction vessel is not accompanied by a rise in pressure in the system so long as the storage chamber is held at constant temperature by the water bath. For example, in the operation, if the temperature of the reaction vessel is 20° C., the pressure cannot be more than approximately 4.6 lbs. per square inch gage, or condensation of ethyl chloride vapor will occur in the reaction vessel. On the other hand, if the storage chamber of ethyl chloride is maintained at 20° C., the reaction vessel may be held at any temperature above 20° C. without raising the pressure in the system above 4.6 lbs. per square inch gage, provided communication is maintained between vessel and tank. The operating pressure is thus determined by the temperature of the storage chamber of ethyl chloride, and not by the reaction temperature. In other words, the pressure in the system cannot rise above the vapor pressure of ethyl chloride at the temperature of the closed storage chamber. The temperature of the storage chamber is, obviously, readily governed and the reaction, therefore, easily controlled.

Our process may, of course, be modified in several ways. For instance, it may be carried out identically as described above, except that a solvent for ethyl chloride (e. g., benzene, toluene, solvent naphtha, mineral oil, etc.) is added to the alloy charge before treatment with ethyl chloride vapor, thereby increasing the rate of absorption of ethyl chloride.

Or, again, the lead-sodium alloy may be treated with a solution of ethyl chloride in a solvent. The primary object of the solvent in this case is to reduce the vapor pressure of the ethyl chloride so that the process may be operated at a convenient temperature without concomitant production of an excessive pressure.

It has been established, that the reaction takes place readily under these conditions.

In order to present our process in detail, an example of a typical embodiment thereof is furnished below. It is to be understood, of course, that the specific temperature, pressures and other conditions appearing therein are merely illustrative:

A charge of 230 lbs. of PbNa was placed in a vessel that could be closed gas-tight and which was connected to another vessel containing ethyl chloride in such manner that ethyl chloride vapor might flow from the storage to the reaction vessel or vice versa, the ethyl chloride tank being maintained at 40° C., giving a pressure of 20 lbs. per square inch. The reaction vessel was then swept with ethyl chloride vapor to displace the air, closed, and the reaction allowed to proceed until the vapor was no longer absorbed. The temperature of the reaction vessel maintained itself at about 60° C. Upon completion of the reaction, the tetra ethyl lead was recovered from the reaction mass by steam distillation.

In the above example no reducing, hydrolytic or catalytic agents were used. If it is desired to use a solvent for the ethyl chloride in order to increase the rate of absorption, as discussed above, it should be used in amounts which will generally range from 10% to 20% of the weight of the alloy. In a number of operations of the process as exemplified, the consumption of ethyl chloride ranged from 66 to 74 lbs. for each operation.

It is obvious that the process is capable of other modifications such as the admission in the beginning, of liquid ethyl-chloride from the condensation vessel or the use of a solvent for ethyl chloride in the condensation chamber. Such obvious modifications we intend to cover by the appended claims.

We claim:

1. In the manufacture of tetra-ethyl-lead, the step of treating mono-sodium-lead alloy with gaseous ethyl chloride at a pressure below the vapor pressure of the ethyl chloride corresponding to the temperature of the reaction mass.

2. In a process of manufacturing tetra-ethyl-lead comprising effecting a reaction in a closed vessel between gaseous ethyl chloride and mono-sodium-lead at low pressure, the step of maintaining the pressure of the ethyl chloride in the reaction vessel at a point below the vapor pressure of ethyl chloride corresponding to the temperature obtaining in said vessel.

3. In the manufacture of tetra-ethyl-lead, the step of effecting a reaction between gaseous ethyl chloride and a sodium lead alloy in a closed vessel, the vapor space of said vessel communicating with that of a second closed vessel maintained at a lower temperature than the first.

4. In the manufacture of tetra-ethyl-lead by effecting a reaction between gaseous ethyl chloride and a sodium-lead alloy, carrying out said reaction in a closed vessel, the space above the alloy communicating with the closed space above a body of liquid ethyl chloride maintained at a lower temperature than that in the vessel.

5. In the treatment of a lead sodium alloy with gaseous ethyl chloride to produce tetra-ethyl-lead, carrying out said treatment in a closed vessel with the vapor space thereof communicating with a condensation chamber and controlling the temperature of said chamber so that the pressure in the system will be below the vapor pressure of ethyl chloride at the temperature of the vessel.

6. In the treatment of a lead sodium alloy with gaseous ethyl chloride to produce tetra-ethyl-lead, carrying out said treatment in a closed vessel with the vapor space thereof communicating with the closed space above a body of a liquid comprising ethyl chloride and maintaining the temperature of said body below the temperature obtaining in the vessel.

7. In the treatment of a lead sodium alloy with gaseous ethyl chloride to produce tetra-ethyl-lead, carrying out said treatment in a closed vessel having the vapor space thereof communicating with the closed space above a body of a liquid comprising ethyl chloride, and maintaining the temperature of said body at such a point that the pressure thereon will be below the vapor pressure of ethyl chloride at the temperature of the reaction vessel.

8. In the process of manufacturing tetra-ethyl-lead, which comprises reacting in a closed vessel upon mono-sodium-lead with gaseous ethyl chloride, the method of maintaining a substantially constant pressure in said vessel, which comprises providing communication between the vapor space thereof and the vapor space of a closed storage chamber containing a body of liquid ethyl chloride, said chamber being held at a constant temperature.

9. The method as set forth in claim 8, wherein the temperature of the body of liquid is so regulated that the pressure obtaining in the system is less than the vapor pressure of ethyl chloride at the temperature prevailing in the reaction chamber.

10. The process as set forth in claim 8, in which the storage chamber has a temperature to give a pressure of about 20 lbs. per square inch, and the reaction vessel has a temperature of about 60° C.

11. The process of manufacturing tetra-ethyl-lead which comprises effecting a reaction between gaseous ethyl chloride at a pressure of about 20 pounds per square inch and mono-sodium lead at a temperature of about 60° C.

12. The process as set forth in claim 1, in which the reaction is effected in a closed vessel during agitation of the lead alloy, the vapor space of said vessel communicating with a storage chamber, and in which process the temperature of said storage chamber is so regulated that the pressure in the vessel is less than the vapor pressure of ethyl chloride at the temperature obtaining in the reaction chamber.

13. The process of manufacturing tetraethyl lead by effecting a reaction between gaseous ethyl chloride and a lead sodium alloy, which comprises placing the alloy and a solvent for ethyl-chloride in a closed chamber, sweeping said chamber with ethyl chloride vapor, establishing communication between the vapor space of said chamber and the closed space above a body of liquid ethyl chloride, and maintaining the temperature of said body of liquid at such a point that the pressure in the chamber is less than the vapor pressure of the ethyl chloride therein.

14. In the manufacture of tetra-ethyl-lead, the method of effecting a reaction between ethyl chloride and a lead sodium alloy, which comprises adding a solution of ethyl chloride to said alloy in a vessel the vapor space above said alloy communicating with the upper part of a storage chamber and maintaining the temperature of said chamber at such a point below that of the vessel that the pressure in the vessel is always less than the vapor pressure of ethyl chloride at the temperature obtaining in the vessel.

In testimony whereof we affix our signatures.

WILLIAM S. CALCOTT.
FREDRICK L. ENGLISH.